United States Patent
Wagaj et al.

(10) Patent No.: US 12,385,736 B2
(45) Date of Patent: Aug. 12, 2025

(54) AUTOMATED NONCONTACT SENSOR POSITIONING

(71) Applicant: GLEASON METROLOGY SYSTEMS CORPORATION, Dayton, OH (US)

(72) Inventors: Parag Prakash Wagaj, Springboro, OH (US); Ethan James Shepherd, West Carrollton, OH (US); Michael R. Tanner, Cincinnati, OH (US); Edward J. Damron, Waynesville, OH (US); Douglas Charles Beerck, Dayton, OH (US)

(73) Assignee: GLEASON METROLOGY SYSTEMS CORPORATION, Dayton, OH (US)

( * ) Notice: Subject to any disclaimer, the term of this patent is extended or adjusted under 35 U.S.C. 154(b) by 150 days.

(21) Appl. No.: 18/250,032

(22) PCT Filed: Nov. 16, 2021

(86) PCT No.: PCT/US2021/072424
§ 371 (c)(1),
(2) Date: Apr. 21, 2023

(87) PCT Pub. No.: WO2022/109542
PCT Pub. Date: May 27, 2022

(65) Prior Publication Data
US 2023/0408252 A1    Dec. 21, 2023

Related U.S. Application Data

(60) Provisional application No. 63/116,302, filed on Nov. 20, 2020.

(51) Int. Cl.
*G01B 11/24* (2006.01)
*B23F 23/12* (2006.01)
(Continued)

(52) U.S. Cl.
CPC .......... *G01B 11/2416* (2013.01); *B23F 23/12* (2013.01); *G01B 11/005* (2013.01); *G01M 13/021* (2013.01)

(58) Field of Classification Search
CPC ...... B23F 23/12; B23F 23/1218; G01B 11/00; G01B 11/002; G01B 11/005;
(Continued)

(56) References Cited

U.S. PATENT DOCUMENTS 3,583,072 A * 6/1971 Muller .................. G01M 13/02
33/501.13
3,590,491 A * 7/1971 Anthony .................. G01B 5/20
33/501.19
(Continued)

FOREIGN PATENT DOCUMENTS

WO    2016/166035 A1    10/2016
WO    2018/048872 A1    3/2018
WO    2019/083932 A1    5/2019

OTHER PUBLICATIONS

International Search Report and Written Opinion for PCT/US2021/072424, ISA/EPO, Feb. 4, 2022, 12 pgs.

*Primary Examiner* — John R Lee
(74) *Attorney, Agent, or Firm* — Robert L. McDowell

(57) ABSTRACT

A multi-axis system (30) for positioning a workpiece measuring sensor (54) on a metrology machine. Preferably, each sensor is positionable via a system comprising movement along and/or about at least linear directions/axes (X, Z, A, B) so as to control linear and/or rotational movement of a sensor automatically to a predetermined position without operator intervention. The multi-axis positioning system allows faster setup times when a workpiece or tooling on a machine is changed.

11 Claims, 13 Drawing Sheets

(51) Int. Cl.
*G01B 11/00* (2006.01)
*G01M 13/021* (2019.01)

(58) Field of Classification Search
CPC ... G01B 11/007; G01B 11/24; G01B 11/2416; G01B 5/00; G01B 5/0002; G01B 5/0004; G01M 13/00; G01M 13/02; G01M 13/021; G01M 13/022; G01M 13/023; G01M 13/025; G01M 13/026; G01M 13/027; G01M 13/028
See application file for complete search history.

(56) References Cited

U.S. PATENT DOCUMENTS

| | | | | |
|---|---|---|---|---|
| 4,547,674 A * | 10/1985 | Pryor | | G01B 11/2416 |
| | | | | 250/559.38 |
| 4,910,561 A * | 3/1990 | Tsujiuchi | | G01B 11/2416 |
| | | | | 356/512 |
| 5,287,293 A * | 2/1994 | Chen | | G06T 7/0006 |
| | | | | 382/152 |
| 5,373,735 A * | 12/1994 | Gutman | | G01M 13/021 |
| | | | | 356/23 |
| 5,506,683 A * | 4/1996 | Yang | | G01B 11/2518 |
| | | | | 356/606 |
| 5,978,500 A * | 11/1999 | Broughton | | G06T 7/0004 |
| | | | | 382/152 |
| 6,182,506 B1 * | 2/2001 | Hoikkala | | B23F 23/1218 |
| | | | | 74/423 |
| 6,868,617 B1 * | 3/2005 | Winn | | G01M 13/021 |
| | | | | 33/501.13 |
| 7,755,771 B2 * | 7/2010 | Komori | | G01B 11/2416 |
| | | | | 356/601 |
| 9,539,619 B2 * | 1/2017 | Kujacznski | | G01N 21/8901 |
| 10,088,431 B2 * | 10/2018 | Offenborn | | F42B 35/00 |
| 10,094,785 B2 * | 10/2018 | Offenborn | | G01B 11/2425 |
| 10,323,927 B2 * | 6/2019 | Stigwall | | G01B 11/005 |
| 11,092,430 B2 * | 8/2021 | Wagaj | | G01B 5/202 |
| 11,215,448 B2 * | 1/2022 | Aiardi | | G01D 5/14 |
| 11,262,190 B2 * | 3/2022 | Wagaj | | G01B 11/005 |
| 11,359,913 B2 * | 6/2022 | Le Neel | | G01B 11/2518 |
| 11,371,836 B2 * | 6/2022 | Le Neel | | G01B 11/024 |
| 11,402,201 B2 * | 8/2022 | Rees | | G01B 21/042 |
| 11,754,387 B2 * | 9/2023 | Shepherd | | G01B 21/042 |
| | | | | 33/503 |
| 2009/0103112 A1 * | 4/2009 | Nygaard | | G01B 11/245 |
| | | | | 356/638 |
| 2009/0249633 A1 * | 10/2009 | Patrick | | G01M 13/02 |
| | | | | 33/501.8 |
| 2015/0066390 A1 * | 3/2015 | Chen | | G01M 13/021 |
| | | | | 702/35 |
| 2016/0161250 A1 | 6/2016 | Nakamura | | |
| 2020/0292305 A1 * | 9/2020 | Wagaj | | G01B 11/2416 |
| 2022/0074732 A1 * | 3/2022 | Shepherd | | G01B 11/005 |
| 2023/0051393 A1 * | 2/2023 | Hunter | | G01B 5/0004 |
| 2023/0191543 A1 * | 6/2023 | Feied | | B21D 7/024 |
| | | | | 29/33 R |
| 2023/0408252 A1 * | 12/2023 | Wagaj | | G01B 5/0004 |
| 2024/0335894 A1 * | 10/2024 | Dietz | | G05B 19/406 |

\* cited by examiner ions (and reflections) in desired directions with respect to a gear tooth surface (i.e. in desired directions of X, Y, Z and rotations about X, Y and Z) for appropriate measuring. Once set for a particular workpiece, laser 54 is fixed in position via mounting mechanism 58. For different workpiece geometries, laser 54 must be repositioned manually.

AUTOMATED NONCONTACT SENSOR POSITIONING

FIELD OF THE INVENTION

The present invention relates primarily to the positioning of non-contact sensors for inspecting workpieces including gears and other toothed articles, particularly on functional measurement platforms that produce analytical test results.

BACKGROUND OF THE INVENTION

For many years dimensional inspection (i.e. measurement) of gears and gear-like workpieces (e.g. cylindrical and bevel gears, worms) has mostly been carried out by two different methodologies, namely, (1) functional testing comprising meshing a gear or other toothed workpiece with a known master gear or mating gear, and (2) analytical testing using a coordinate measurement machine (CMM) or a gear measurement machine (GMM) such as the GMS line of gear measurement machines manufactured by, and commercially available from, the Applicant.

Functional testing compares the measurement of a work piece against a master gear or a mating gear. Functional testing platforms for gears (i.e. roll testers) include those testers known as double flank testers and single flank testers. With single flank testing, mating gears roll together at their proper (fixed) center distance with backlash and with only one flank in contact. Gears can be tested in pairs or with a master gear. With double flank testing, mating gears are rolled together in tight mesh which produces contact on both flanks. A work gear is meshed with master gear. By providing various encoders on the platform, the relative movement of gears (i.e. center distance variation) making up a collection or summary of gear errors is captured. For example, on a typical double flank gear roll testing machine, a work piece (e.g. cylindrical gear) is meshed with a known master part (e.g. cylindrical gear) and rotated. One of the gears is mounted on a fixed axis and other is mounted on a floating axis. The linear displacement between the axes is measured when the two gears are rotated. Composite errors from this functional testing, such as center distance variation, are reported and compared against required tolerances. Such a roll tester is also capable of reporting characteristics related to the size of gear teeth such as tooth thickness and diameter-over-pins (DOP).

A typical CMM or GMM utilizes at least one contact probe. In recent years, a non-contact sensor (e.g. laser) has been used to inspect some gears as is disclosed in WO 2018/048872, the disclosure of which is hereby incorporated by reference. A contact probe is positioned at programmable locations on a gear tooth surface to measure its deviation from a theoretical tooth surface. A non-contact probe emits light on the tooth surface of a gear at a desired location to determine the same deviation.

Analytical testing of gears may be done by either a GMM or CMM. These machines include a computer-controlled apparatus which includes a high-resolution touch sensor (e.g. tactile probe) and/or a non-contact probe. The machine of WO 2018/048872 is an example of an analytical machine for inspecting a gear workpiece utilizing a touch sensor and/or a laser sensor for inspection. Both sensors require repeatable positioning of the sensor for reliable and accurate measurement at desired locations on the gear tooth surface.

CMM and GMM machines are both equipped with probes capable of measuring the location of points on the surface of workpieces. This is one of the core functions of these machines and is used to implement the full range of functionality available on these machines (e.g. measuring size, location, deviation from theoretical surface and form of geometric shapes). These measurements are checked against certain tolerances to ensure the correct fit and function of the measured workpieces.

To measure a workpiece, the machine must convert the signal output from its probe (or probes) and the respective position of the relevant machine axes into the location of points on the surface of a workpiece. For this reason, the orientation of sensors to properly approach desired areas of a gear and the accurate calibration of sensors are very important. When a workpiece is changed to another workpiece having a different geometry, the positions of sensors will likely require adjustment for accurate measurement of the "different geometry" workpiece.

In metrology systems such as disclosed by WO 2019/083932, the disclosure of which being hereby incorporated by reference, at least one non-contact sensor and preferably two non-contact sensors are utilized to measure gear artifacts. Preferably, two lasers are located in a manual set-up fixed position on a post and are oriented in such a way that each laser measures one flank of a gear.

Prior art FIGS. 1, 2 and 3 show a machine 50, of the type as disclosed by WO 2019/083932, comprising at least one non-contact sensor assembly 52 on a functional testing platform for workpiece inspection and/or measurement. The machine 50 comprises a base portion having a top portion 8 (preferably a flat plate), production gear 16 (i.e. the workpiece) and master gear 14 mounted on respective workholding arbors 18 and 12, such as mechanical, hydraulic or pneumatic arbors as is known to the skilled artisan. A slide plate 10 is affixed to slide 26 and arbor 12 is positioned on plate 10. The production gear 16 may be located on either the left hand side or on the right hand side of the master gear 14 but is shown on the left side in FIG. 1. The gear 16 rotates about a motorized axis W via motor 17. The master gear 14 is mounted on right hand side (axis T) and is not motorized. The rotation of master gear 14 is provided by the driving motor 17 for axis W and the engagement with the production gear 16.

For functional testing, the master gear 14 is on a slide 26 (X axis) and is moveable in the direction of the X axis (preferably horizontal) to allow coupling and decoupling of gears. Decoupling is required so that the production gear 16 can be removed and replaced with different workpieces either manually or via automation means. A linear scale 7 (FIG. 3) is mounted to capture movement of the slide 26 in the X axis direction during operation. A rotary encoder 19 is mounted below the motorized production gear 16 (axis W) to capture rotary movement of the workpiece gear. Inputs of the rotary encoder and the linear scale are captured so that during rotation of gear pair, relative movement of gears (in the X direction) is measured with respect to the rotary position of the workpiece gear 16.

As shown in FIG. 1, a non-contact sensor such as an optical sensor, for example a laser assembly 52, is positioned on left side of the machine for analytical testing. A single laser 54 is mounted on a linearly adjustable post 56 having an adjustable mounting mechanism 58 whereby the laser 54 is movable and positionable in up to three linear directions X, Y, Z (preferably mutually perpendicular) and in up to three rotational directions, that is, about each of X, Y and Z for manually setting the operating position of the laser. In other words, laser 54 is preferably capable of six degree-of-freedom movement but only for set-up purposes. Such adjustability is preferable in order to orient the laser emission line 60 onto a gear tooth space whereby it can capture at least a portion of the tooth involute (i.e. profile direction) from root-to-tip for both tooth flanks of adjacent teeth.

However, the only computer-controlled axis on the machine of FIG. 1 for analytical testing is the workpiece rotational axis W. The machine lacks the ability to re-position the probe via movement along and/or about one or more linear axes. Computer controlled positioning of a workpiece 16 relative to laser 54 via motion along or about one or more mutually perpendicular directions or axes X, Y and Z (i.e. three dimensional) is not possible and, hence, computer-controlled calibration of laser 54 via motion along or about one or more mutually perpendicular directions or axes is also not possible.

SUMMARY OF THE INVENTION

The present invention is directed to a multi-directional positioning system for positioning a workpiece measuring sensor on a metrology machine. Preferably, each sensor is positionable via a system comprising movement in at least one linear direction and at least one rotary direction so as to control linear and/or rotational movement of a sensor automatically to a predetermined position without operator intervention. The multi-directional positioning system allows faster setup times when a workpiece or tooling on a machine is changed.

The inventive multi-directional positioning system is preferably operable to provide linear motion in one or two directions (i.e. linear motions) and/or rotational/angular motion about one or two axes (i.e. rotary motions) with position feedback (e.g. linear and/or rotary encoders) which are controlled by motors (e.g. stepper or servo) to move each sensor in the necessary direction or directions whereby the sensor is properly positioned in order to measure a desired surface on a workpiece such as the tooth surface of a gear.

DETAILED DESCRIPTION OF THE PREFERRED EMBODIMENT

Figure 1:
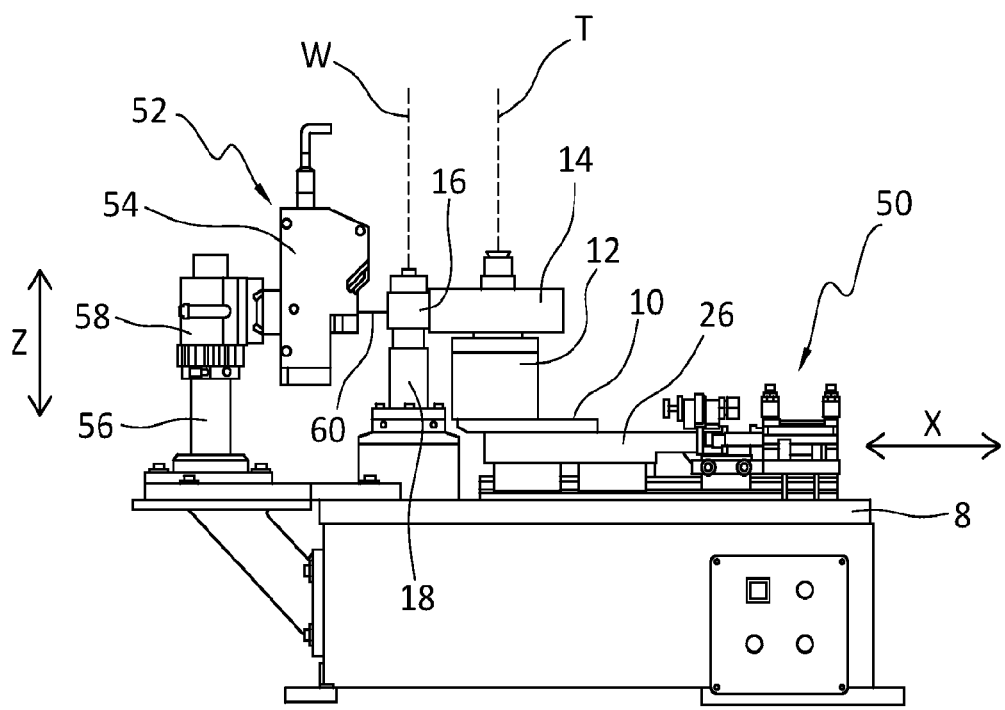
FIG. 1 is a front view of a known machine showing two gears in rolling engagement and non-contact inspecting of one of the gears.
Figure 2:
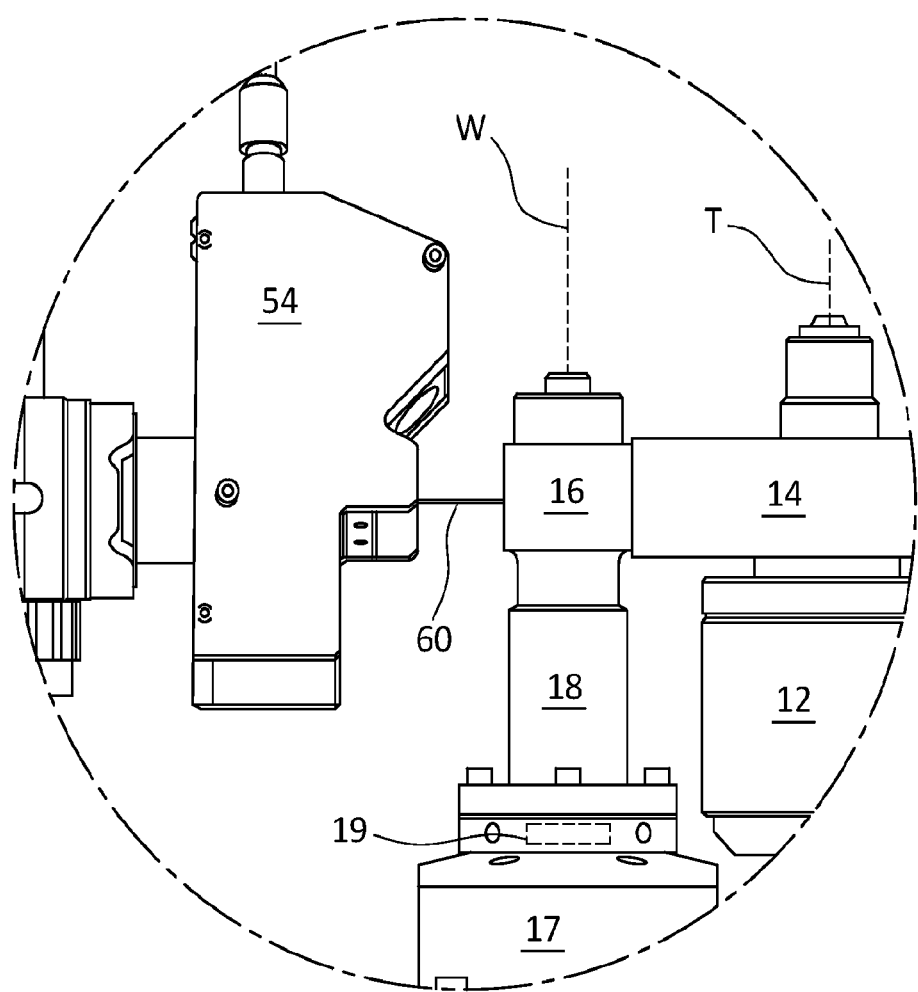
FIG. 2 is an enlarged view of the non-contact sensor inspecting portion of FIG. 1.
Figure 3:
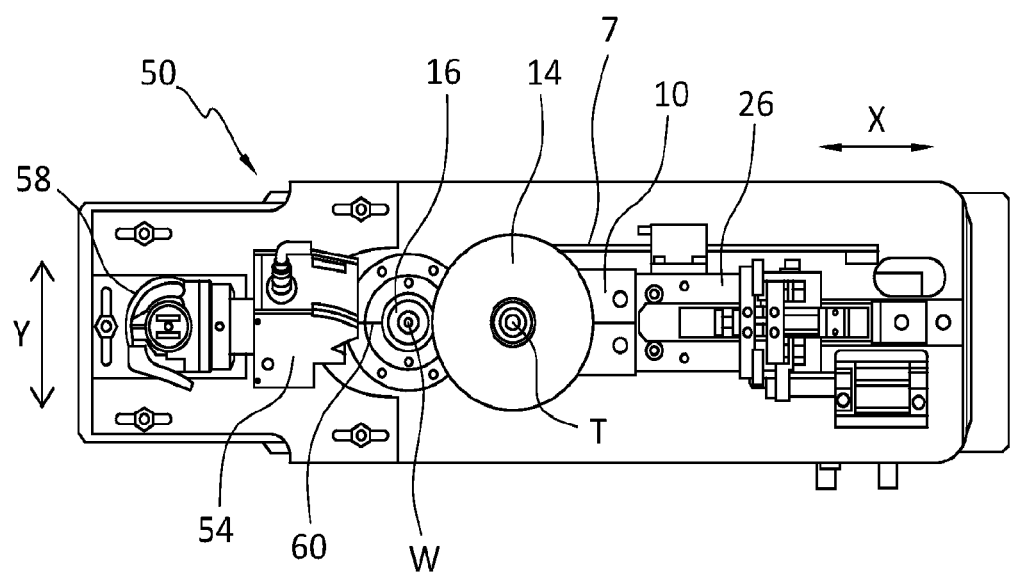
FIG. 3 is a top view of the machine of FIG. 1.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from the drawings.

The use of "including", "having" and "comprising" and variations thereof herein is meant to encompass the items listed thereafter and equivalents thereof as well as additional items. The words "a" and "an" are understood to mean "one or more" unless a clear intent to limit to only one is specifically recited. The use of letters to identify elements of a machine, method or process is simply for identification and is not meant to indicate importance or significance, or that the elements/steps should be performed in a particular order. As used herein, the term "and/or" includes any and all combinations of one or more of the associated listed items and may be abbreviated as "/".

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance unless specifically recited.

The invention comprises a multi-axis positioning system capable of moving a sensor and a workpiece relative to one another and addresses the heretofore inability to adequately re-position a sensor automatically, particularly a non-contacting sensor such as an optical sensor, particularly a laser sensor, with respect to a workpiece such as a gear, shaft or other toothed article (collectively referred to hereafter as "gear"), using linear and rotary axes with no intervention from the machine operator.

Figure 4:
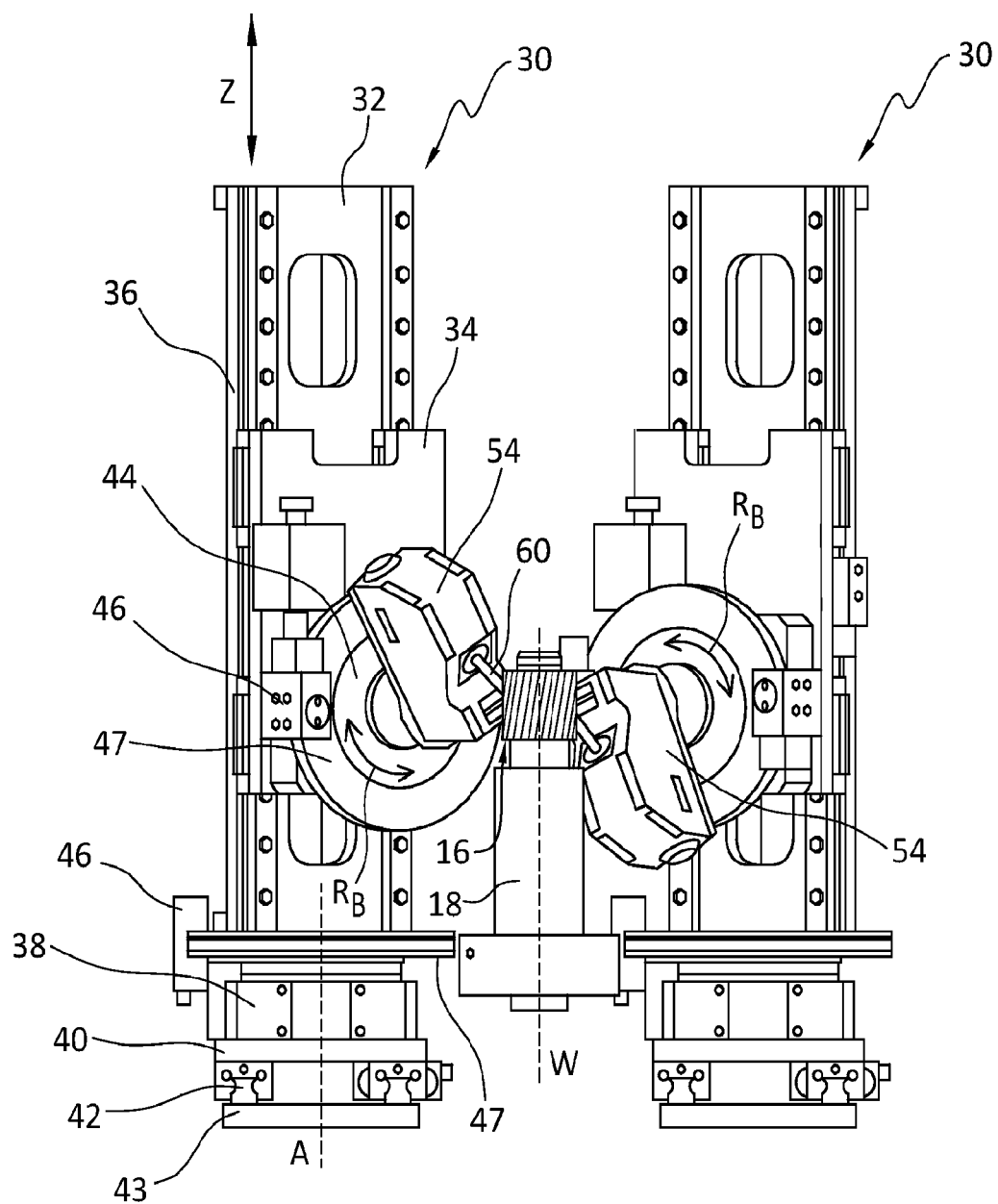
FIG. 4 is a front view showing two inventive multi-directional positioning systems.
Figure 5:
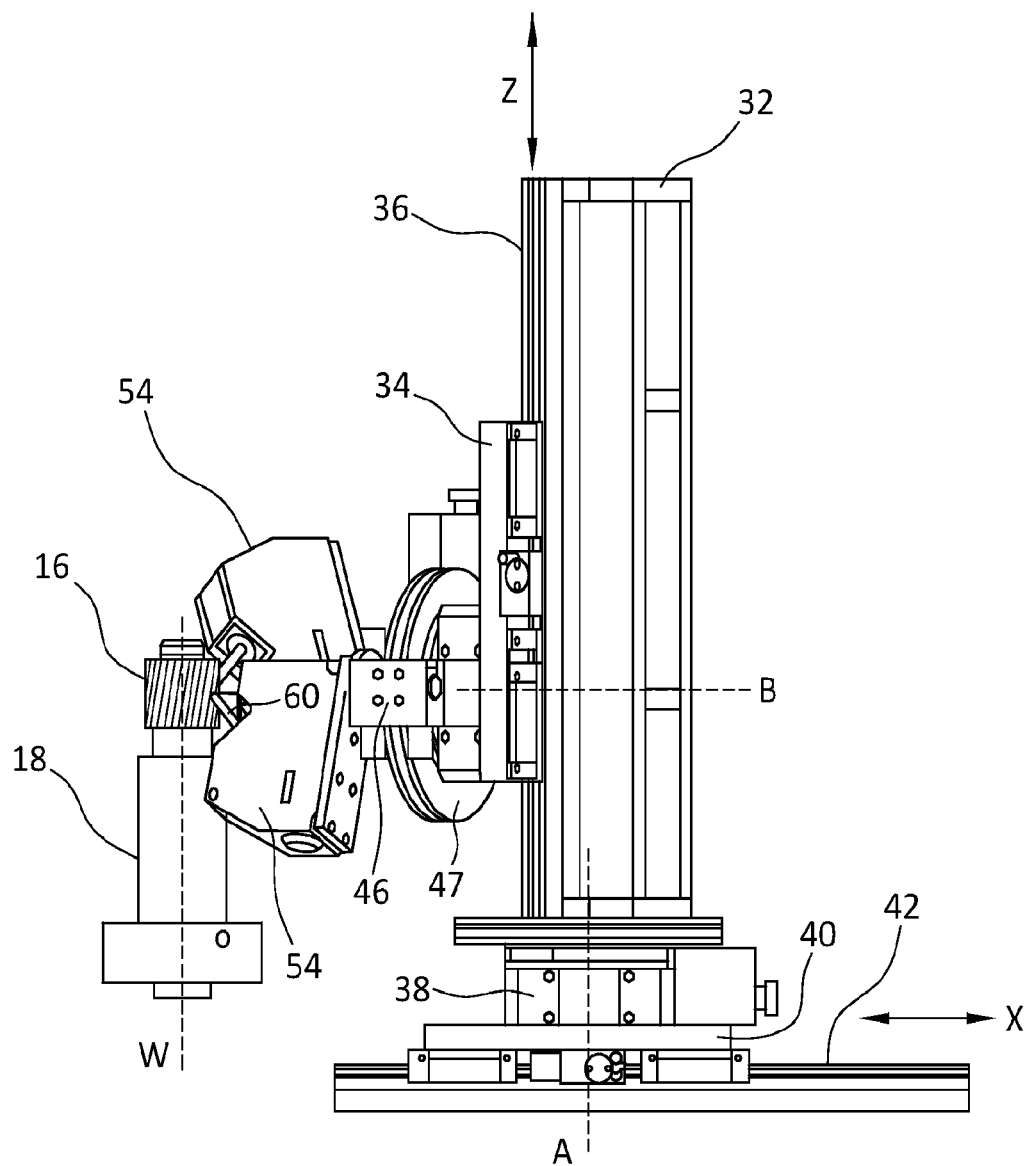
FIG. 5 is a side view of the positioning systems of FIG. 4.
Figure 6:
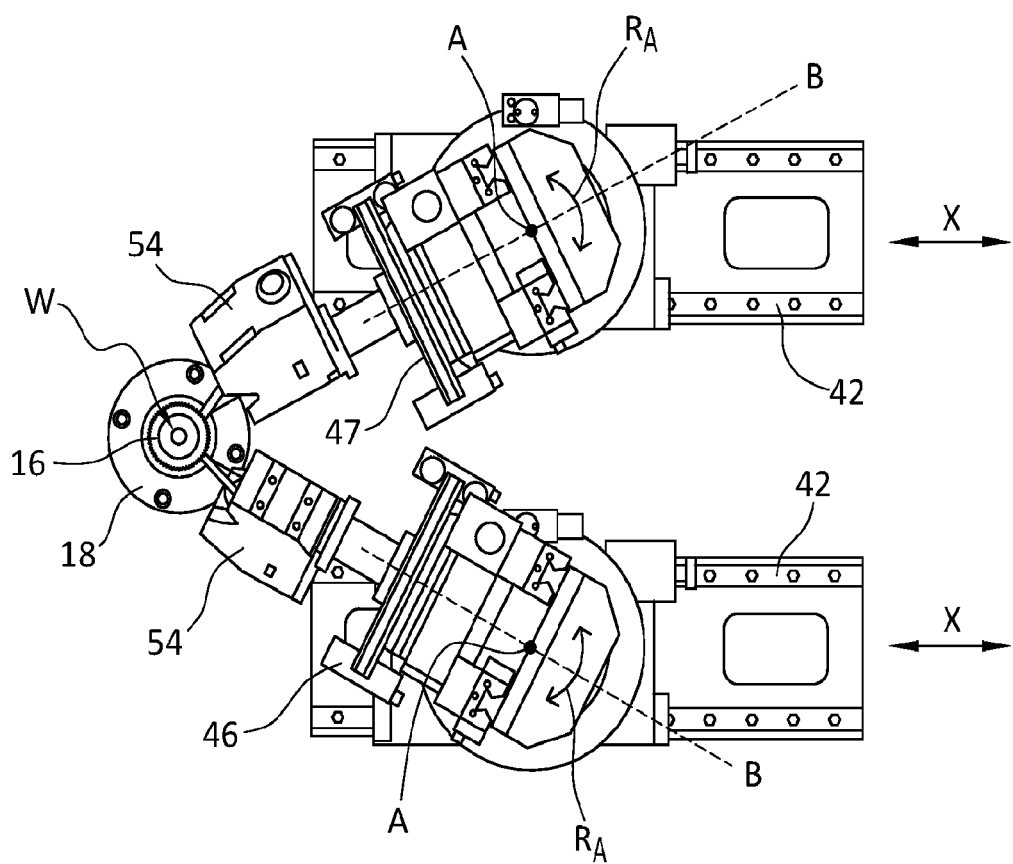
FIG. 6 is a top view of the positioning systems of FIG. 4.

The inventive multi-directional positioning system is shown in a first embodiment by FIGS. 4-6 where two positioning systems 30 are illustrated in order to accommodate two non-contact, preferably optical (e.g. laser) sensors 54 for measuring a workpiece 16. One sensor is positioned to scan tooth flanks on one side of the workpiece teeth and the other sensor is positioned to scan tooth flanks on the opposite side of the workpiece teeth as can be best seen in FIG. 5 wherein a laser emission line 60 is shown projecting from each sensor 54. While the following description of the inventive position system will refer to only one positioning system 30, it is understood that the description applies equally to additional positioning systems such as both positioning systems 30 in FIGS. 4-6.

Positioning system 30 comprises a column 32 on which slide 34 is positioned for Z-direction movement (preferably vertical as viewed in normal operation) on column 32 via guide rails 36. Column 32 is attached to a rotary base 38 which is rotatable, as shown by arrow $R_A$, about axis A (preferably oriented vertical as viewed in normal operation) thereby enabling column 32, and sensor 54, to be angularly adjustable/rotatable about the A-axis (see FIG. 6). Base 38 is positioned on slide 40 which is movable in the X-direction (preferably horizontal as viewed in normal operation) on a base plate 43 via guide rails 42 (FIGS. 5, 6) so as to position column 32 in the X-direction. Direction Z lies in a first plane which, as normally viewed, is vertical (i.e. the plane of the page of FIG. 4) and direction X lies in a second plane which, as normally viewed, is horizontal (i.e. the plane of the page of FIG. 6) with the first and second planes being perpendicular to one another. Directions Z and X are preferably perpendicular to one another. The A-axis is preferably parallel to the Z direction, may lie in the first plane, and is preferably perpendicular to the X-direction. Base plate 43 is preferably attached to top portion 8 of the machine base.

A rotatable mounting plate or disc 44 (i.e. rotary stage) is attached to slide 34 and is angularly adjustable/rotatable, as shown by arrow $R_B$, about axis B (preferably oriented horizontal as viewed in normal operation, see FIGS. 5, 6) via a motorized drive or a worm and wheel drive for example. Preferably, the B-axis extends parallel to the second plane and is perpendicular to, intersects, and is angularly movable about the A-axis during the angular adjustment $R_A$ of column 32 about the A-axis (FIG. 6). Laser sensor 54 is positioned on mounting plate 44 whereby the sensor is angularly adjustable/rotatable about the B-axis. A braking mechanism, preferably a disc brake mechanism comprising a caliper 46 and brake disc 47, is preferably associated with rotary base 38 and/or rotatable mounting plate 44 for stopping rotary motion and securely maintaining the angular position of the rotary base 38 and/or rotatable mounting plate 44 during operation of the sensor. While the disc brake mechanism is preferred, other braking and/or clamping mechanisms may be utilized.

Different motions, or combinations of motions, may be performed by the positioning system 30, or elements thereof, in order to accommodate different workpiece geometries or the change from one workpiece geometry to another workpiece having a different geometry. Some examples (non-exhaustive list) include:

Motions about the A axis, in the X-direction and about the workpiece spindle axis (W) may be performed to adjust the position and orientation of the sensor 54 relative to a workpiece in order to accommodate a range of parts with different modules, pitch diameters or outside diameters.

Motion about the B-axis, and including motion about the A-axis as may be needed, may be carried out to adjust the orientation of the sensor 54 relative to a workpiece to accommodate for a range of parts with different helix angles and hands of rotation.

Motion in the Z-direction may be performed to accommodate a range of parts with different face widths and spindle tooling lengths.

Motions in the X-direction and about the A-axis may be performed to accommodate parts having teeth with different pressure angles.

With a sensor, or sensors, suitably positioned, the workpiece may be measured accurately.

Movement of each of slide 34 in direction Z, column 32 in direction X, column 32 about axis A, mounting disc 44 about axis B and workpiece rotation about axis W is imparted by separate drive motors such as, for example, servo or stepper motors or worm and wheel drives (not shown). The above-named components are capable of independent movement with respect to one another or may move simultaneously with one another. Each of the respective motors is preferably associated a feedback device such as a linear or rotary encoder (not shown) as part of a CNC system which governs the operation of the drive motors in accordance with instructions input to a computer controller (i.e. CNC) which may be a dedicated computer control for the positioning system 30 or, for example, the computer control for a functional testing platform of the type shown in FIG. 1.

Figure 7:
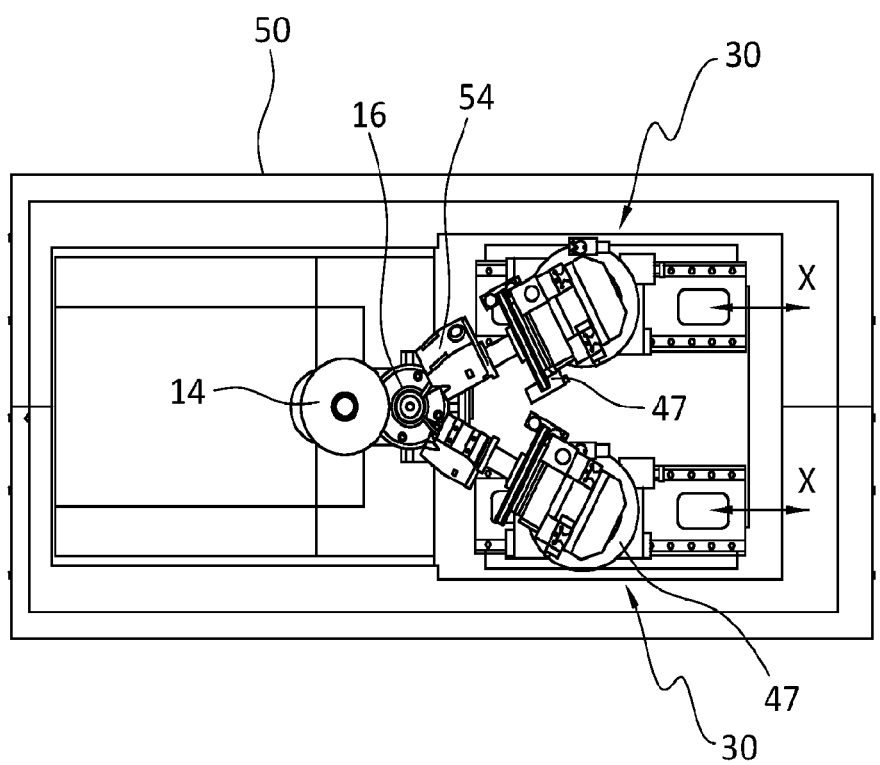
FIG. 7 is a top view of two inventive positioning systems arranged on a functional gear testing platform.
Figure 8:
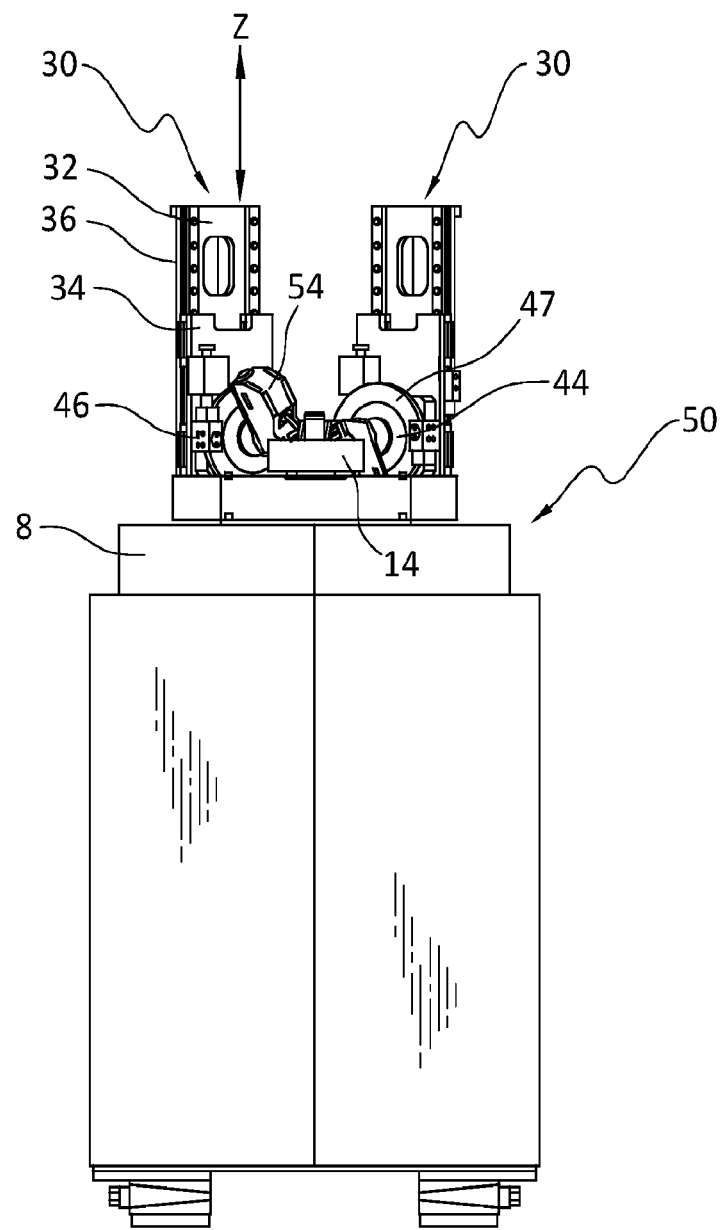
FIG. 8 is a front view of two inventive positioning systems arranged on a functional gear testing platform.
Figure 9:
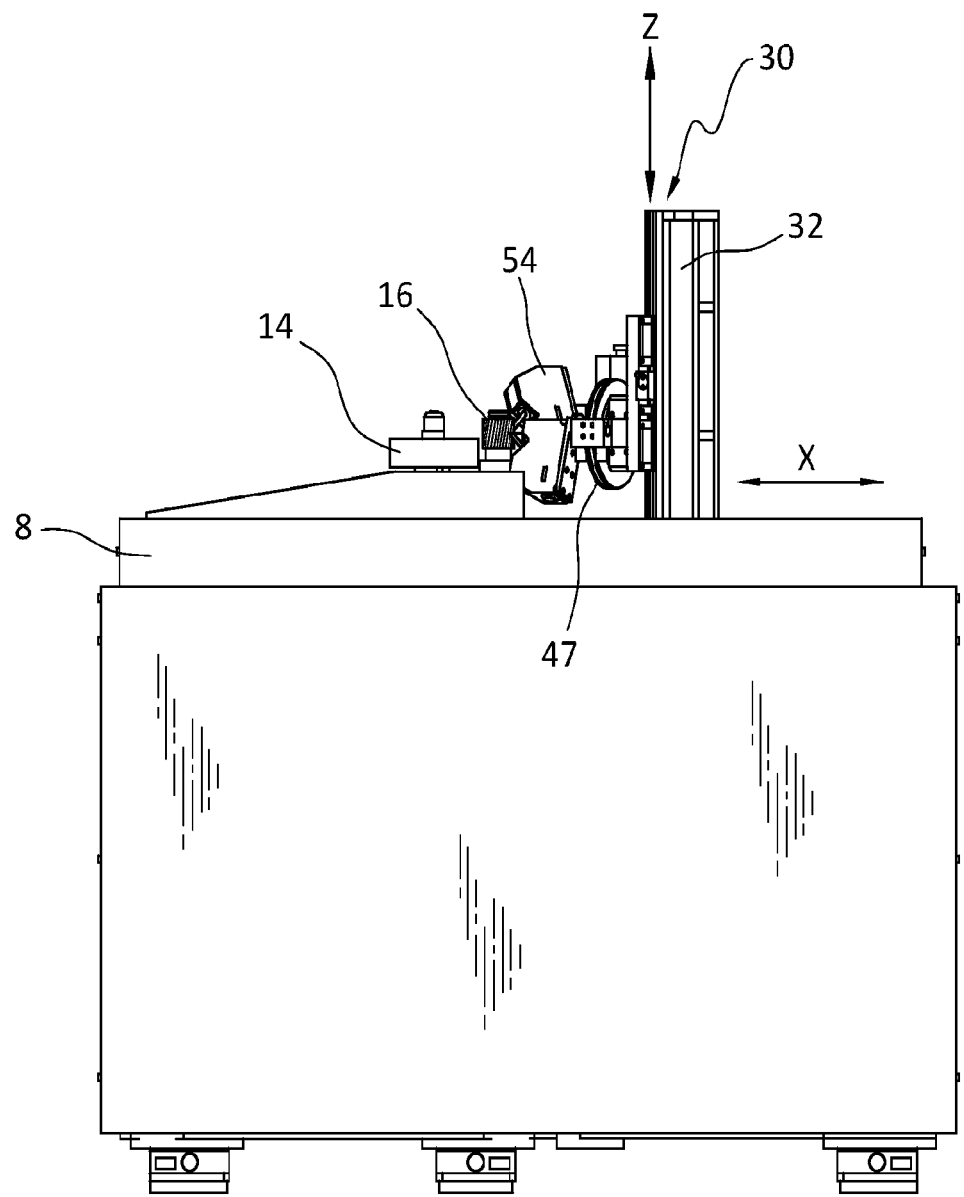
FIG. 9 is a side view of two inventive positioning systems arranged on a functional gear testing platform.

FIGS. 7, 8 and 9 show two of the inventive positioning systems 30 located on a functional testing platform 50 of the type shown in FIG. 1. For simplicity and ease of viewing, elements such as slide plate 10, slide 26 and linear scale 7 have been omitted. However, instead of a non-contact sensor, such as a laser assembly 52, requiring manual setup of axes positions to achieve the appropriate operating position relative to a workpiece 16 located on the functional testing platform 50, the inventive positioning system 30 automatically achieves the appropriate operating position of the non-contact sensor (e.g. laser) 54 relative to workpiece 16. The operating positioning being accomplished via the previously described positioning system comprising linear and/or rotational motions to automatically move the sensor to a predetermined position without operator intervention.

Figure 10:
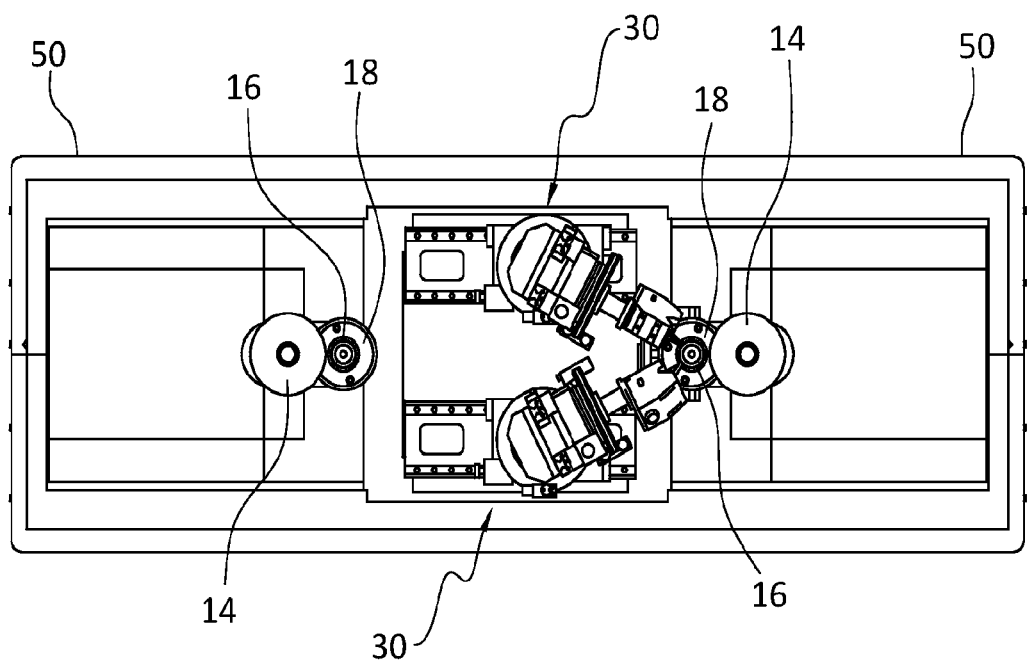
FIG. 10 illustrates a top view of two functional gear testing platforms arranged end-to end, with respect to their respective workpiece spindles, and including two inventive positioning systems arranged between the workpiece spindles.

FIG. 10 shows two functional testing platforms 50 arranged in an end-to-end manner whereby the inventive position system 30 (two shown) is located between the respective workpiece spindles 18 of the testing platforms. In this arrangement, one of the positioning systems 30 can be utilized to position a sensor relative to a workpiece on one platform 50 (e.g. right side in FIG. 10) and the other positioning systems 30 can be utilized to position a sensor relative to a workpiece on the other platform 50 (e.g. left side in FIG. 10). The ability of the positioning system 30 to be angularly positionable about the A-axis and linearly movable in the X-direction enable such functionality. Alternatively, both positioning systems 30 may be directed to a workpiece on one spindle, (e.g. right-side as shown in FIG. 10), and then both positioning systems may be redirected to a workpiece on the other spindle (e.g. left-side spindle of FIG. 10).

Figure 11:
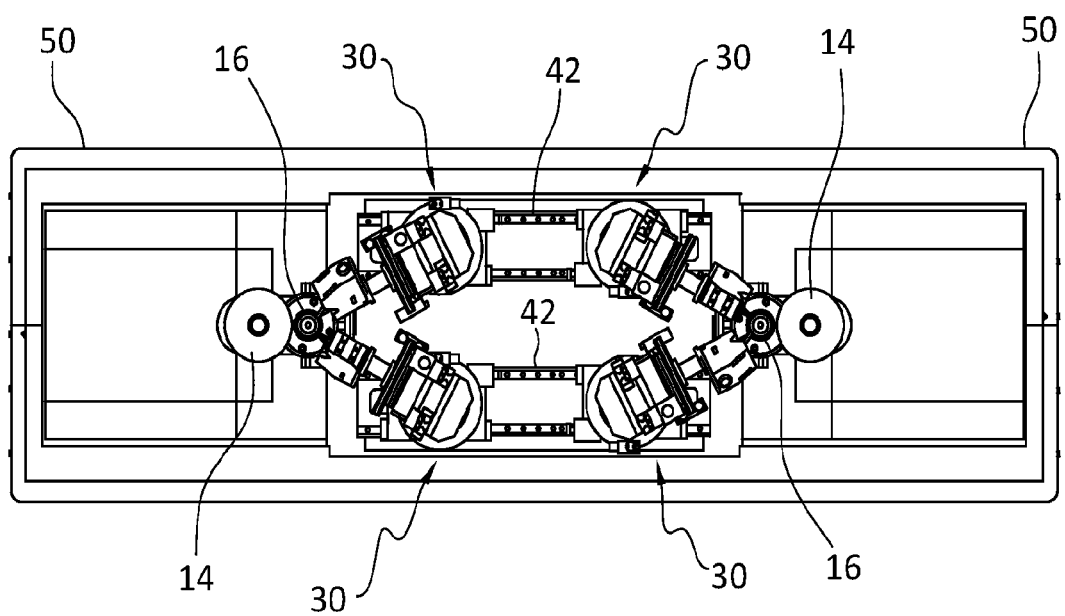
FIG. 11 illustrates a top view of two functional gear testing platforms arranged end-to end, with respect to their respective workpiece spindles, and including four inventive positioning systems arranged between the workpiece spindles.

FIG. 11 shows an arrangement of functional testing platforms 50 similar to FIG. 10 but with the inclusion of two sets (total of 4) positioning systems 30 wherein two positioning systems 30 are dedicated to the right-side functional testing platform and two positioning systems 30 are dedicated to the left-side functional testing platform. In the embodiment of FIG. 11, two X-direction-oriented positioning systems share one set of X-direction guide rails 42.

While the above discussion has been directed to a positioning system for appropriately positioning a non-contact sensor, such as an optical sensor, for example a laser, relative to a workpiece, the inventive positioning system may also be operated in an active manner during a scanning (e.g. measuring/inspection) process. The positioning system may be operated to reposition the non-contact sensor during scanning in order to reposition the sensor, either continually, incrementally and/or intermittently, whereby a greater portion of a gear tooth flank surface in the profile direction (i.e. tooth height) and/or in the lead direction (i.e. tooth length) may be scanned compared to the scanned area of a fixed position sensor.

Although the preferred orientation of axes (i.e. A, B) and directions of motion (i.e. X, Y) of the positioning system 30 are shown in FIGS. 4-6, the invention is not limited thereto. For example, as best explained with reference to FIG. 7, X-direction motion of the position system 30 relative to a workpiece 16 may be effected by the master gear 14 and workpiece 16 being movable in the X-direction instead of X-direction movement of the positioning system 30. Alternatively, X-direction movement capability may be included with the positioning system 30 as well as with the master gear 14 and workpiece 16.

While the inventive positioning system has been discussed and illustrated in association with a functional testing platform for gears, the positioning system is not limited thereto. The inventive positioning system 30 may be associated with (e.g. located on) other types of machine tools such as, for example, other gear manufacturing machines such as gear cutting machines (e.g. hobbing, power skiving) or gear finishing machines (e.g. grinding, honing, power skiving, hard skiving, polishing). The X-direction of travel may function for infeeding and withdrawing a non-contact sensor, or another tool, relative to a workpiece.

Figure 12:
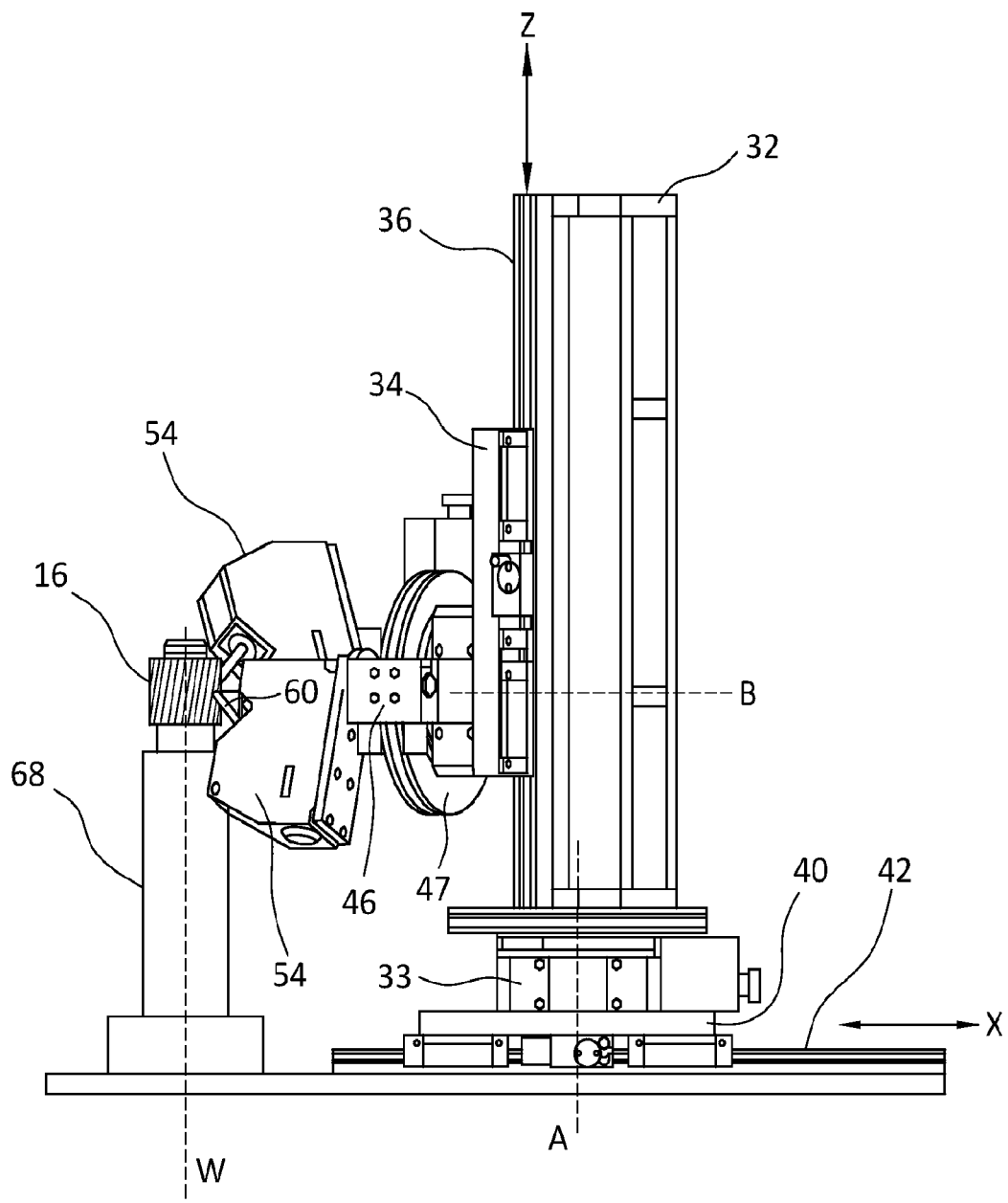
FIG. 12 is a side view of two inventive multi-axis positioning systems with the inclusion of a workpiece spindle.

Additionally, the positioning system may be modified to include a workpiece spindle 68 such as shown in FIG. 12 thereby creating a standalone non-contact measuring apparatus for gears and/or other toothed articles.

Figure 13:
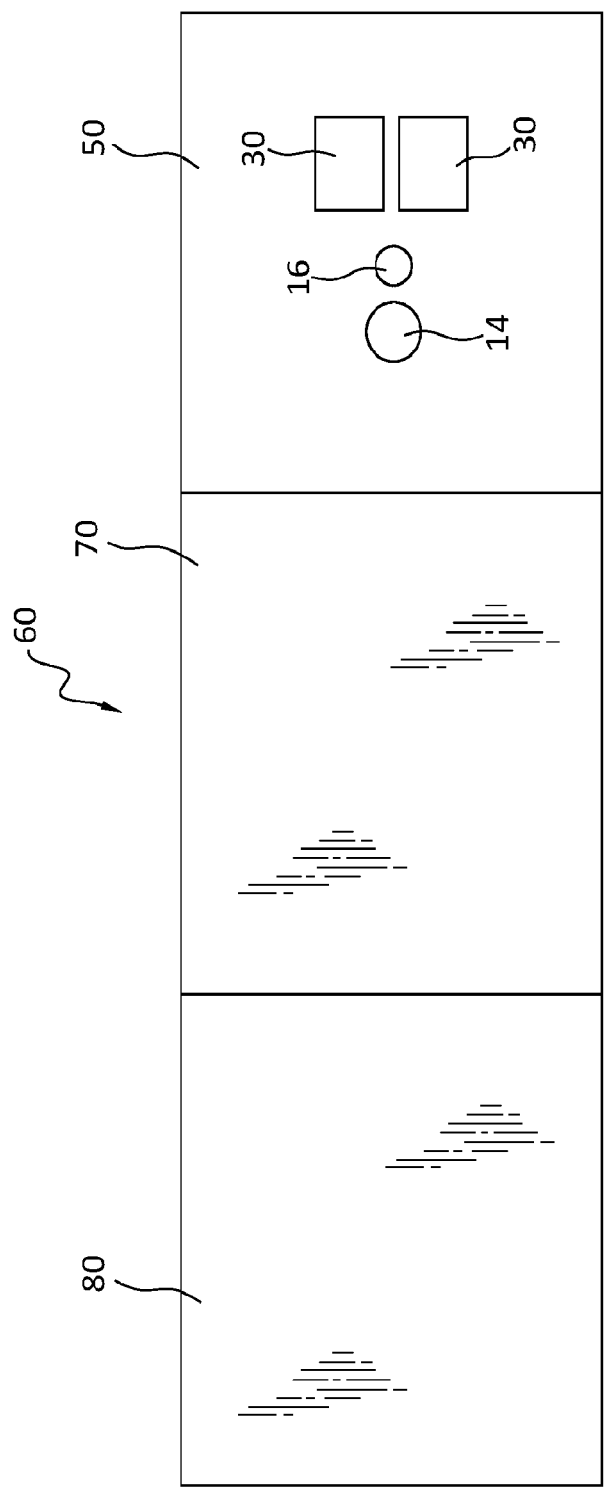
FIG. 13 diagrammatically illustrates the functional gear testing platform of FIG. 7 as being one part of a gear hard finishing or soft manufacturing cell.

FIG. 13 represents a gear manufacturing cell 60 such as a hard finishing cell wherein a testing machine, such as the functional testing platform 50 of FIG. 7, is one component of the cell. In the example of a hard finishing cell, block 80 represents a gear processing machine for finishing a previously cut workpiece. Examples of finishing include grinding (e.g. threaded-wheel and/or profile grinding), honing, power skiving, hard skiving, finish hobbing, and polishing. An automation system 70, preferably a robotic system, for loading and unloading both machines 50 and 80, and transferring workpieces between the machines, is located between the gear processing machine 80 and the testing platform 50. Automation system 70 may also include additional devices for performing auxiliary processes such as, for example, part washing, laser marking, sorting, measuring and part handling in a stackable basket system. The gear manufacturing cell may be an automated closed-loop cell wherein part measurement information, particularly out-of-tolerance measurements, obtained by the functional testing platform 50 is communicated to the gear processing machine 80 and any process adjustments are automatically made to the operational settings of the gear processing machine to correct the detected deficiencies in the machined part. Preferably, 100 percent of parts processed by the machine 80 are measured and/or tested by the functional testing platform 50.

Although the gear manufacturing cell 60 of FIG. 13 has been discussed with regard to hard finishing, it is not limited thereto. Alternatively, the gear manufacturing cell 60 may be configured for non-hard finishing machining (e.g. "rough" or "soft" machining, collectively referred to hereafter as "soft") wherein block 80 represents a machine for performing a soft operation such as, for example, rough (initial) hobbing, face milling or face hobbing of bevel gears, power skiving (soft), shaping and shaving. The soft gear manufacturing cell may also be an automated closed-loop cell wherein part measurement information, particularly out-of-tolerance measurements, obtained by the functional testing platform 50 is communicated to the gear processing machine 80 and any process adjustments are automatically made to the operational settings of the gear processing machine to correct the detected deficiencies in the machined part. Preferably, 100 percent of parts processed by the machine 80 are measured and/or tested by the functional testing platform 50.

Figure 14:
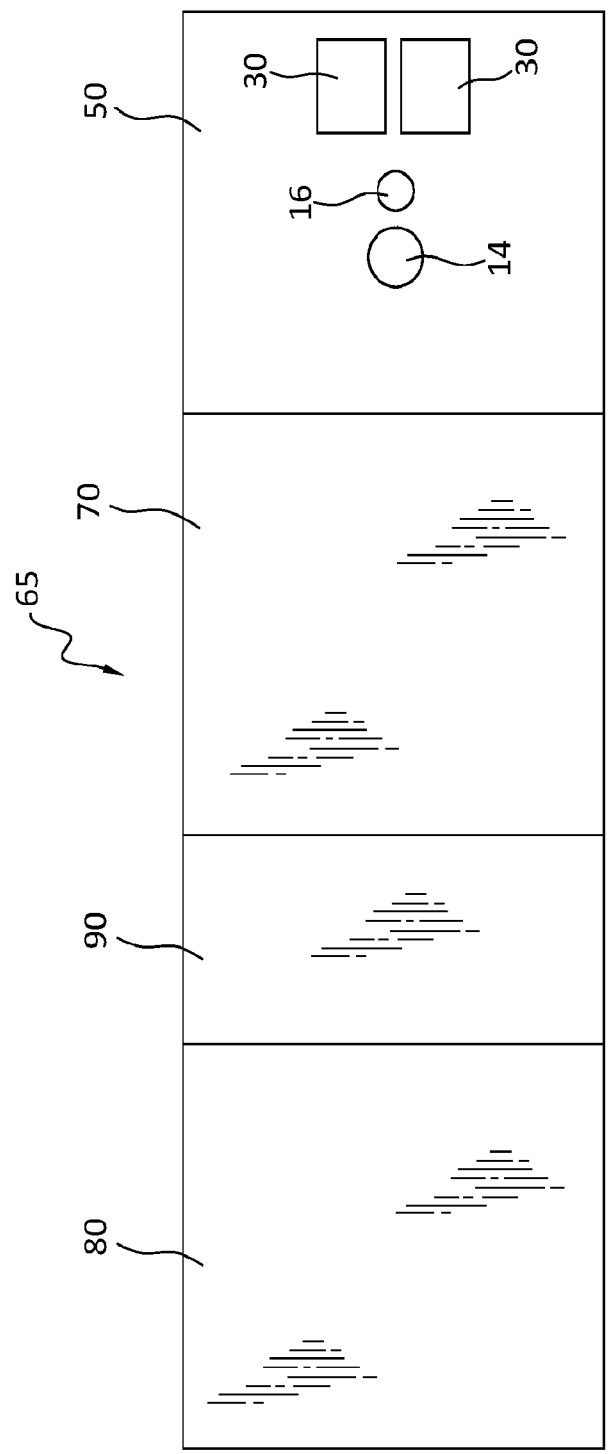
FIG. 14 diagrammatically illustrates the functional gear testing platform of FIG. 7 as being one part of a soft gear manufacturing cell including a chamfering and/or deburring machine.

The soft machining cell may further include means for chamfering and/or deburring a workpiece produced by a soft operation. Chamfering and/or deburring units may be incorporated within the machine 80 or the manufacturing cell may include an additional machine for chamfering and/or deburring. FIG. 14 shows an example of such a manufacturing cell 65 wherein block 90 represents a chamfering and/or deburring machine. Automation system 70, preferably a robotic system, performs loading and unloading of machines 50, 80 and 90, and transfers workpieces between the machines. Such a soft manufacturing cell may also be configured as an automated closed-loop cell with 100 percent inspection of workpieces as discussed above.

While the invention has been described with reference to preferred embodiments it is to be understood that the invention is not limited to the particulars thereof. The present invention is intended to include modifications not specifically detailed herein which would be apparent to those skilled in the art to which the subject matter pertains without deviating from the spirit and scope of the appended claims.

What is claimed is:

1. A multi-directional positioning system for positioning a
   workpiece measuring and/or inspection non-contact sensor on a machine,
   said sensor being positionable via an automatic system comprising movement in at least one linear direction and at least one rotary direction so as to control linear and/or rotational movement of said sensor automatically to a predetermined position without operator intervention,
   said positioning system comprising a column having a first slide positioned on said column, said first slide being movable along said column in a first linear direction Z,
   said column being attached to a rotary base enabling rotary movement, RA, of said column about an axis A, with said axis A being parallel to said first linear direction Z,
   said sensor being attached to said first slide and being rotatable, RB, on said first slide about an axis B which extends perpendicular to and intersects said axis A,
   said rotary base being movable in a second linear direction X, said direction X and said direction Z being perpendicular to one another.

2. The multi-directional positioning system of claim 1 wherein the workpiece comprises a toothed article.

3. The multi-directional positioning system of claim 1 further including a workpiece spindle.

4. The multi-directional positioning system of claim 1 wherein at least one of said positioning system is located on a gear manufacturing, measuring and/or inspecting machine.

5. The multi-directional positioning system of claim 4 wherein said at least one of said positioning system is located on a measuring and/or inspecting machine comprising a functional testing platform.

6. The multi-directional positioning system of claim 5 wherein the functional testing platform comprises a master gear and a workpiece positioned thereon wherein the master gear and the workpiece are movable in the X direction.

7. The multi-directional positioning system of claim 5 wherein the functional testing platform is one machine of a plurality of machines defining a gear manufacturing cell.

8. The multi-directional positioning system of claim 1 wherein at least one of said positioning system is located between two functional testing platforms arranged end-to-end.

9. A gear metrology machine comprising the multi-directional positioning system of claim 1.

10. A method of measuring and/or inspecting a toothed article with at least one non-contact sensor wherein the at least one sensor and the toothed article are positioned relative to one another prior to measuring and/or inspecting wherein the method comprises:

positioning said at least one sensor via an automatic system comprising the multi-directional positioning system of claim 1, measuring and/or inspecting at least one surface of said toothed article.

11. The method of claim 10 further including:

moving said at least one sensor relative to the toothed article during the measuring and/or inspecting comprising moving the at least one sensor in at least one linear direction and at least one rotary direction in order to reposition the sensor, either continually, incrementally and/or intermittently, during the measuring and/or inspecting whereby a greater surface portion of the toothed article in a profile direction and/or in a lead direction may be measured and/or inspected.

* * * * *